United States Patent
Li et al.

(10) Patent No.: US 7,885,348 B2
(45) Date of Patent: Feb. 8, 2011

(54) MIMO COMMUNICATION SYSTEM AND METHOD FOR BEAMFORMING USING POLAR-CAP CODEBOOKS

(75) Inventors: Qinghua Li, Sunnyvale, CA (US); Xintian E Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 11/615,736

(22) Filed: Dec. 22, 2006

(65) Prior Publication Data

US 2007/0195974 A1 Aug. 23, 2007

Related U.S. Application Data

(60) Provisional application No. 60/771,729, filed on Feb. 9, 2006.

(51) Int. Cl.
*H04B 7/02* (2006.01)
*H04L 1/02* (2006.01)
*H04L 27/00* (2006.01)
*H04L 27/28* (2006.01)
*H04K 1/10* (2006.01)

(52) U.S. Cl. ................. 375/267; 375/269; 375/260; 455/132; 455/504

(58) Field of Classification Search ........... 375/259, 375/260, 267; 455/132, 504
See application file for complete search history.

(56) References Cited

U.S. PATENT DOCUMENTS

| | | | |
|---|---|---|---|
| 7,570,696 B2 * | 8/2009 | Maltsev et al. ............ 375/260 |
| 2005/0037733 A1 * | 2/2005 | Coleman et al. ........... 455/411 |
| 2005/0107057 A1 * | 5/2005 | Sun ........................... 455/272 |
| 2005/0254347 A1 * | 11/2005 | Beaucoup ................... 367/905 |
| 2005/0286663 A1 * | 12/2005 | Poon ......................... 375/347 |
| 2005/0287978 A1 * | 12/2005 | Maltsev et al. ............ 455/403 |
| 2006/0052138 A1 * | 3/2006 | Reilly et al. .............. 455/561 |
| 2006/0155533 A1 * | 7/2006 | Lin et al. ................... 704/223 |
| 2006/0155534 A1 * | 7/2006 | Lin et al. ................... 704/223 |
| 2006/0276228 A1 * | 12/2006 | Jin et al. ................. 455/562.1 |
| 2007/0149181 A1 * | 6/2007 | Lin et al. ................... 455/415 |
| 2007/0164902 A1 * | 7/2007 | Bang et al. ................ 342/377 |

FOREIGN PATENT DOCUMENTS

WO WO-2007092539 A2 8/2007

OTHER PUBLICATIONS

"European Application Serial No. 07763551.4 , Response filed Aug. 2009 to Office Action mailed Jul. 1, 2009".
"European Application Serial No. 07763551.4, Office Action mailed Jul. 1, 2009", 3 pgs.

(Continued)

*Primary Examiner*—David C Payne
*Assistant Examiner*—Erin M File
(74) *Attorney, Agent, or Firm*—Schwegman, Lundberg & Woessner, P.A.; Gregory J. Gorrie

(57) ABSTRACT

Embodiments of a multiple-input multiple-output (MIMO) communication system and methods for beamforming using polar-cap codebooks are generally described herein. Other embodiments may be described and claimed. In some embodiments, beamforming is based on codewords of a polar-cap codebook which represents deviations in the channel with respect to codewords of a full-manifold codebook.

20 Claims, 4 Drawing Sheets

OTHER PUBLICATIONS

Conway, J H, "Packing Lines, Planes, etc.: Packings in Grassmannian Spaces", *Experiment Mathematics*, 5 (2), (1996), 1-35.

Conway, J. H, et al., "Packing Lines, Planes, etc., Packings in Grassmannian Spaces", *Experimental Mathematics*, vol. 5, (1996), 139-159.

Li, Qinghua, et al., "A Low Feedback Scheme for WMAN MIMO Beamforming", *Radio and Wireless Symposium, IEEE*, (Jan. 9-11, 2007), 349-352.

Samanta, R., et al., "Codebook Adaptation for Quantized MIMO Beamforming Systems", *Conference Record of the Thirty-Ninth Asilomar Conference on Signals, Systems and Computers*, (2005), 376-380.

Wang, Daifeng, et al., "Codebook Design for Noncoherent MIMO Communications Via Reflection Matrices", *Globecom '06. IEEE Global Telecommunications Conference*, (2006), 1-5.

Zheng, Lizhong, et al., "Communication on the Grassmann Manifold: A Geometric Approach to the Noncoherent Multiple-Antenna Channel", *IEEE Transactions on Information Theory*, 48 (2), (Feb. 2002), 359-83.

* cited by examiner

MIMO COMMUNICATION SYSTEM AND METHOD FOR BEAMFORMING USING POLAR-CAP CODEBOOKS

PRIORITY CLAIM

This application claims the benefit of priority under 35 U.S.C. 119(e) to U.S. Provisional Patent Application Ser. No. 60/771,729, filed Feb. 9, 2006, which is incorporated herein by reference.

RELATED APPLICATION

This application is related to U.S. patent application Ser. No. 11/036,906, filed Jan. 13, 2005.

TECHNICAL FIELD

Embodiments of the present invention pertain to wireless communications. Some embodiments pertain to beamforming using codebooks in multiple-input multiple-output (MIMO) systems.

BACKGROUND

Closed-loop MIMO systems typically transmit channel state information from a receiver to a transmitter over a feedback path. The channel state information may be used to employ beamforming to compensate for the current channel conditions increasing signal-to-noise (SNR) levels at the receiver. In some of these conventional systems, a beamforming matrix may be generated at the receiver based on the channel conditions. The beamforming matrix may then be provided to the transmitter as feedback. This feedback consumes bandwidth that might otherwise be available for data traffic. To reduce the overhead associated with this feedback, codewords of a known codebook may be provided instead of an actual beamforming matrix. The codewords may indicate which beamforming matrix is to be used by the transmitter.

In MIMO systems, the size of the codebooks may increase significantly with number of transmit antennas $N_t$ and the number of transmitted data streams $N_s$. In some conventional systems, the size of the codebook may be based on the number of transmit antennas and the number of data streams. This results in a significant increase in feedback.

Thus, there are general needs for MIMO systems and methods for beamforming with reduced feedback. There are also general needs for MIMO systems and methods that make use of smaller codebooks. There are also general needs for MIMO systems and methods that provide improved performance without an increase in feedback.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
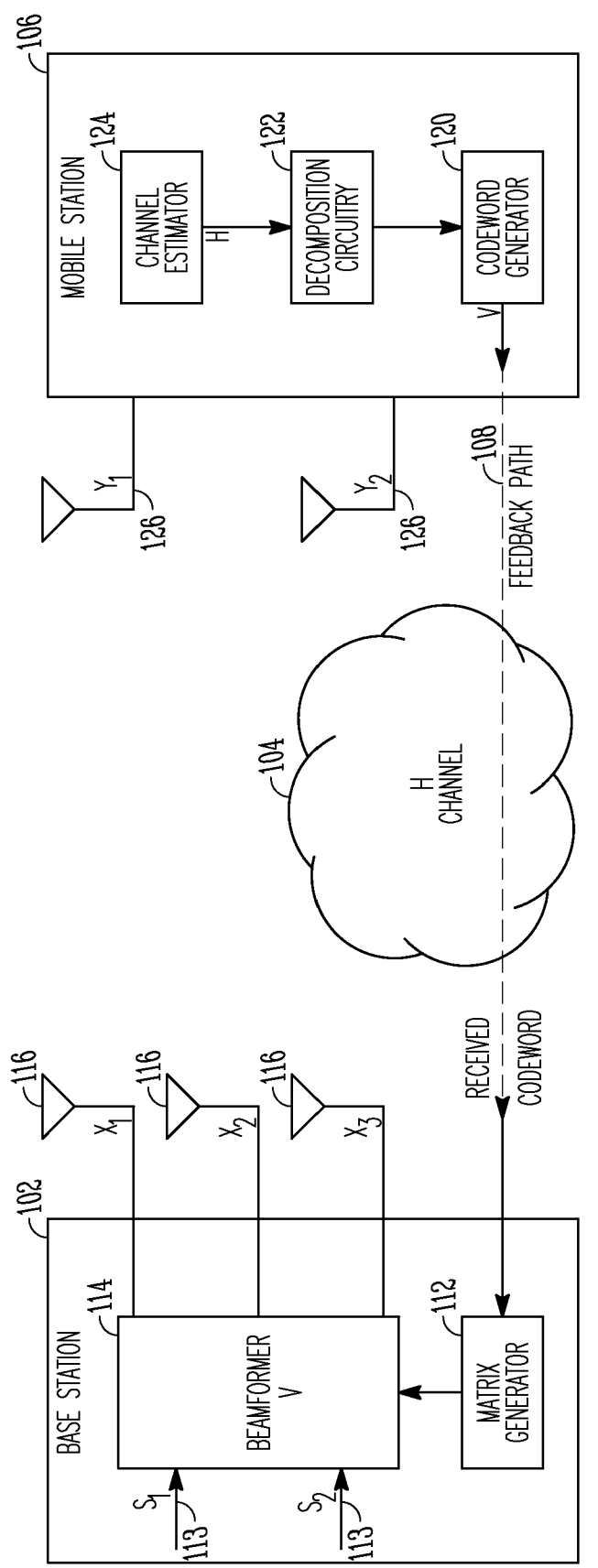
FIG. 1 illustrates a MIMO system in accordance with some embodiments of the present invention.

FIG. 1 illustrates a MIMO system in accordance with some embodiments of the present invention. The MIMO system illustrated in FIG. 1 includes base station 102 and mobile station 106 which communicate through channel 104. In some orthogonal frequency division multiplexed (OFDM) embodiments, base station 102 and mobile station 106 may communicate using multicarrier communication signals comprising a plurality of subcarriers.

In accordance with some embodiments, the MIMO system illustrated in FIG. 1 may be a closed-loop system that employs beamforming to increase the SNR of signals transmitted by base station 102 to mobile station 106. In these embodiments, a series of vector codebooks may be used to populate the surface of a manifold to efficiently encode a beamforming matrix. These full-manifold codebooks may help minimize feedback in the uplink for selecting a beamforming matrix to be used in the downlink. In addition, when channel variations are small compared to the updating period, a set of smaller polar-cap codebooks may be used to correct for channel drift over time. The use of these smaller polar-cap codebooks may enable a further reduction in the amount of feedback, since polar-cap codebooks may be smaller than full-manifold codebooks. These embodiments are discussed in more detail below.

In some other embodiments, polar-cap codebooks may be used to improve performance. In these embodiments, the polar-cap codebooks may be used to more closely track channel variations over time by increasing the resolution of the quantization. These embodiments are also discussed in more detail below.

In some other embodiments, feedback may be further reduced and/or performance may be further improved by alternating use of a full-manifold codebook and a polar-cap codebook in the frequency-domain as well as the time-domain. These embodiments are also discussed in more detail below.

As illustrated in FIG. 1, base station 102 comprises beamformer 114 to weight data signals 113 by a beamforming matrix V. Base station 102 may also comprise transmit antennas 116 to transmit the weighted data signals. Base station 102 may also include matrix generator 112 to generate a beamforming matrix from a codeword received from mobile station 106. In these embodiments, the codeword may be from a full-manifold codebook or a polar-cap codebook, discussed in detail below. In an example embodiment that transmits two data streams (e.g., $s_1$ and $s_2$) with three antennas 116, the transmitted signal may be represented by the following equation:

$$x = \begin{bmatrix} v_{11} & v_{12} \\ v_{21} & v_{22} \\ v_{31} & v_{32} \end{bmatrix} \underbrace{\begin{bmatrix} s_1 \\ s_2 \end{bmatrix}}_{s}$$

In this equation, data symbols $x_1$ through $x_3$ represent the transmitted data signals on transmit antennas 116, data symbol vector S is a vector of $N_s$ data symbols $s_1$ and $s_2$, and V is an $N_t$ by $N_s$ beamforming matrix. In some embodiments, beamforming matrix V may be unitary and power/bit loading may be applied on data symbol vector S.

Mobile station 106 may include one or more receive antennas 126 to receive signals (i.e., $y_1$ and $y_2$) transmitted through channel 104 by base station 102, and channel estimator 124 to determining a channel matrix H which describes the current state of channel 104. Mobile station 106 may also include decomposition circuitry 122 to decompose the channel matrix H into several additional matrices, including beamforming matrix V. Mobile station 106 may also include codeword generator 120 to quantize the beamforming matrix and generate codewords of either a full-manifold codebook or a polar-cap codebook for transmission to base station 102 over feedback path 108. These embodiments are discussed in more detail below.

In these embodiments, channel matrix H may describe the subchannels between each transmit antenna 116 and each receive antenna 126. In the case of three transmit antennas 116 ($N_t$=3) and two receive antennas 126 ($N_r$=2), the channel matrix H, for example, may be a 3×2 matrix. In some OFDM embodiments, channel estimator 124 may generate a channel matrix H for each OFDM tone or groups of OFDM tones based on common pilot signals, although the scope of the invention is not limited in this respect. In some embodiments, mobile station 106 may include at least as many receive antennas 126 as the number of data streams being transmitted by base station 102, although the scope of the invention is not limited in this respect.

In some embodiments, base station 102 may receive a quantized unitary differential feedback matrix $V'_2$ represented by a codeword as feedback to correct and/or modifies a prior received initial quantized feedback matrix $V_1$. In these embodiments, beamformer 114 may generate beamforming coefficients from the differential feedback matrix $V'_2$ and the previously received matrix $V_1$. The beamforming coefficients may be weights that are applied in the frequency-domain to subcarriers (i.e., tones) of the OFDM signals prior to transmission by antennas 116. In these embodiments, the initially received quantized feedback matrix $V_1$ may comprise one or more codewords from a full-manifold codebook. The quantized unitary differential feedback matrix $V'_2$ may comprise one or more codewords from the polar-cap codebook. The polar-cap codebook may be a smaller codebook representing deviations from the full-manifold codebook. In these embodiments, the differential feedback matrix $V'_2$ may comprise a unitary matrix that corrects the prior used beamforming.

The term 'beamforming' is used herein to describe the application of beamforming coefficients or weights to frequency-domain signals prior to transmission. In accordance with embodiments of the preset invention, the beamforming coefficients or weights may be determined from a beamforming matrix which is generated from a decomposition of the channel matrix. This beamforming may be viewed as a generalized version of phased-array beamforming, although the scope of the invention is not limited in this respect.

In some embodiments, base station 102 may be referred to as a transmitting station and mobile station 106 may be referred to as a receiving station, however base station 102 may have receiving capability and mobile station 106 may include transmitting capability. Although base station 102 and mobile station 106 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 102 and mobile station 106 may refer to one or more processes operating on one or more processing elements.

Figure 2:
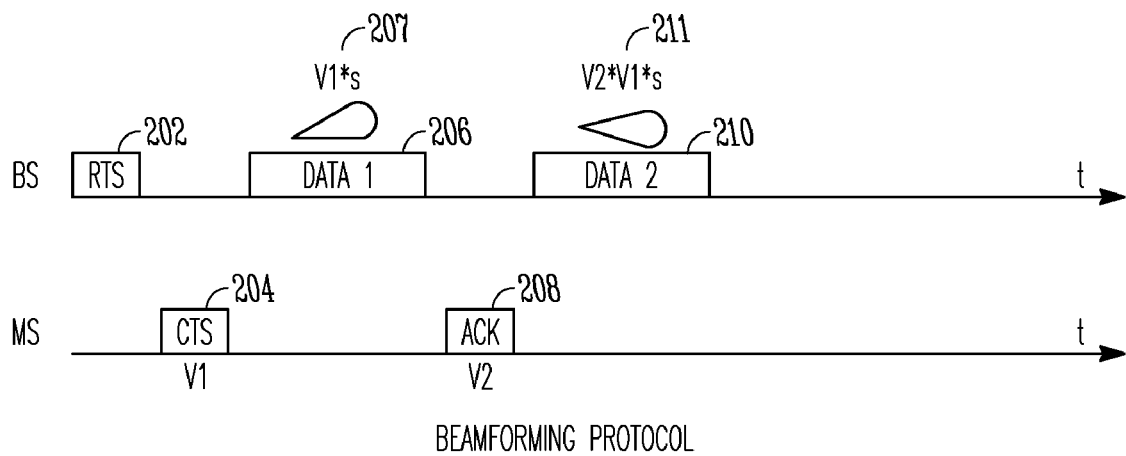
FIG. 2 illustrates a beamforming protocol in accordance with some embodiments of the present invention.

FIG. 2 illustrates a beamforming protocol in accordance with some embodiments of the present invention. In the example illustrated in FIG. 2, a transmitting station, such as base station 102 (FIG. 1), may have data to send to a receiving station, such as mobile station 106 (FIG. 1). In these embodiments, the transmitting station may send request-to-send (RTS) packet 202 to the receiving station. The receiving station may calculate initial beamforming matrix $V_1$ based on the receipt of RTS packet 202 and may send a codeword of a full-manifold codebook to the transmitting station in clear-to-send (CTS) packet 204. The transmitting station may apply beamforming coefficients based on the codeword of the full-manifold codebook for transmitting data packet 206 to the receiving station. Based on the receipt of data packet 206, the receiving station may generate a codeword of a polar-cap codebook representing the deviations or variations in the channel since the generation of the codeword of the full-manifold codebook. The receiving station may transmit the codeword of a polar-cap codebook to the transmitting station within acknowledge (ACK) packet 208. The transmitting station may apply beamforming coefficients based on the codeword of the polar-cap codebook for transmitting data packet 210 to the receiving station. These embodiments are described in more detail below. The application of initial beamforming matrix $V_1$ to one or more data streams 's' for transmitting data packet 206 is illustrated as beamformed data 207 (i.e., $V_1$*s), and the application of a second beamforming matrix $V_2$*$V_1$ to one or more data streams 's' for transmitting data packet 210 is illustrated as beamformed data 211 (i.e., $V_2$*$V_1$*s).

Figure 3:
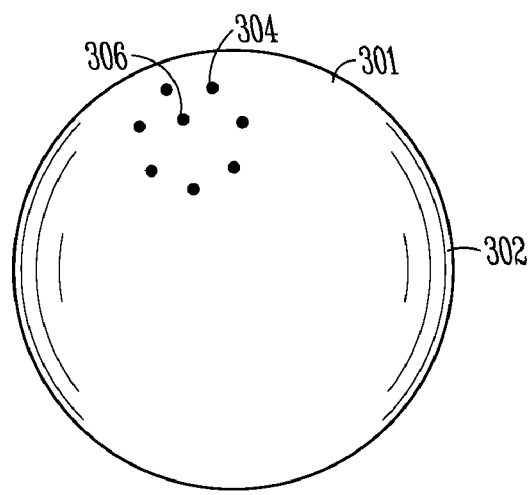
FIG. 3 is a surface illustrating a polar-cap codebook in accordance with some embodiments of the present invention.

FIG. 3 is a surface illustrating a polar-cap codebook in accordance with some embodiments of the present invention. Surface 302 represents codewords (i.e., vectors or matrices) 301 of a full-manifold codebook. In these embodiments, surface 302 may comprise a manifold. Polar ring 304 may be a ring on surface 302 positioned around one of the axes (i.e., poles). The polar-cap codebook may comprise the vectors or matrices within polar ring 304. In some embodiments, the manifold may be a complex Steifel manifold ($V_{k,n}$), in which k is the number of data streams (i.e., k≧1) and n is the number of transmit antennas, although the scope of the invention is not limited in this respect. A vector on a complex manifold, such as the complex Steifel manifold, may be a beamforming matrix. In some embodiments, surface 302 may be illustrated as a spherical surface, although the scope of the invention is not limited in this respect.

Referring to FIGS. 1-3, in accordance with some embodiments, a transmitting station, such as base station 102, may transmit two or more data streams with two or more antennas through channel 104 using time-domain down-sampling. In these embodiments, the transmitting station may receive codeword 301 of the full-manifold codebook. Codeword 301 may be generated by a receiving station, such as mobile station 106, based on an initial channel matrix $H_1$. The transmitting station may subsequently receive codeword 306 of a polar-cap codebook. Codeword 306 may represent deviations or variations in channel 104 since the generation of codeword 301 of the full-manifold codebook. In these embodiments, feedback may be reduced because the polar-cap codebook may be much smaller in size than the full-manifold codebook. Accordingly, the codeword of the polar-cap codebook may be represented by fewer bits than codewords of the full-manifold codebook.

In some embodiments, codeword 301 of the full-manifold codebook may correspond to an initial beamforming matrix $V_1$ for application by beamformer 114. Codeword 306 of the polar-cap codebook may correspond to a differential beamforming matrix $V'_2$ for use in deriving a second beamforming matrix $V_2$ by the transmitting station using the differential beamforming matrix $V'_2$ and the initial beamforming matrix $V_1$. In some embodiments, the transmitting station initially applies beamforming matrix $V_1$ to data packet 206, and subsequently applies a second beamforming matrix (e.g., $V_2 * V_1$) to data packet 210. In these embodiments, the second beamforming matrix may comprise the multiplication of the beamforming matrix $V_2$ and beamforming matrix $V_1$. In these embodiments, the transmitting station may search the full-manifold codebook to determine the initial beamforming matrix, and may search the much smaller polar-cap codebook to determine the second beamforming matrix.

In some embodiments, the full-manifold codebook may comprise codewords corresponding to vectors that populate surface 302 of the manifold. The full set of codewords that comprise the full-manifold codebook may be used for encoding a beamforming matrix. The polar-cap codebook may comprise a differential codebook that is smaller in size than the full-manifold codebook. Codewords of the polar-cap codebook may be within polar ring 304 on surface 302 of the manifold. In these embodiments, the use of a polar-cap codebook provides for tracking the deviation from vectors (i.e., codewords) of the full-manifold codebook.

In some embodiments, for the same number of bits provided as feedback, the codewords of the polar-cap codebook may provide for a greater beamforming resolution than the codewords of the full-manifold codebook. This is because the codewords of the polar-cap codebook represent only the portion of surface 302 that is within polar ring 304. Accordingly, performance of a MIMO may be improved without an increase in feedback.

In some embodiments, the receiving station may generate an initial channel matrix $H_1$ based on measured channel conditions during receipt of a channel sounding packet or RTS packet 202 and may calculate the initial beamforming matrix $V_1$ associated with the codeword 301 of the full-manifold codebook by performing a decomposition of the initial channel matrix $H_1$. In these embodiments, the receiving station may generate a second channel matrix $H_2$ based on subsequently measured channel conditions during receipt of data packet 206 and may calculate the differential beamforming matrix $V'_2$ associated with codeword 306 of the polar-cap codebook.

In some alternate embodiments, the initial beamforming matrix $V_1$ associated with codeword 301 may be selected from the polar-cap codebook, instead of from a full-manifold codebook. In these alternate embodiments, a codeword of the polarcap codebook may be used to generate the initial beamforming matrix thereby providing a further reduction in feedback. In these embodiments, a convergence toward the beamforming matrix of the full-manifold codebook may occur over time, although the scope of the invention is not limited in this respect.

In some embodiments, the receiving station may generate the initial channel matrix $H_1$ based on channel conditions measured during receipt of a channel sounding packet or RTS packet 202, although the scope of the invention is not limited in this respect. In some embodiments, the receiving station may generate the second channel matrix $H_2$ based on channel conditions measured during receipt of data packet 206, although the scope of the invention is not limited in this respect.

In some embodiments, codeword 301 and codeword 306 may be transmitted by a receiving station as part of separate channel-quality-indicator (CQI) packets, although the scope of the invention is not limited in this respect.

In some embodiments, the receiving station may derive the differential beamforming matrix $V'_2$ from the following equation:

$$V'_2 = V_2^H * V_1.$$

In this equation, which $V'_2$ represents the differential beamforming matrix, $V_1$ represents the initial beamforming matrix, and $V_2^H$ represents a Hermitian transpose of the second beamforming matrix. The second beamforming matrix $V_2$ comprises a decomposition matrix of the second channel matrix $H_2$. In these embodiments, the second beamforming matrix $V_2$ may represent a beamforming matrix of the full-manifold codebook for the current channel, and differential beamforming matrix $V'_2$ may represent the differential between the current channel conditions and the prior channel conditions. In these embodiments, differential beamforming matrix $V'_2$ may be much smaller than second beamforming matrix $V_2$ and may be provided as feedback to the transmitting station (e.g., base station 102). In some embodiments, channel estimator 124 may measure the channel 104 to determine channel state information and generate the initial channel matrix $H_1$. Decomposition circuitry 122 may decompose the initial channel matrix $H_1$ to determine the beamforming matrix $V_1$. In some embodiments, decomposition circuitry 122 may perform a singular value decomposition (SVD) of the channel matrix $H_1$. In some embodiments, decomposition circuitry 122 may use the following equation to determine the beamforming matrix $V_1$:

$$H_1 = U_1 \Sigma_1 V_1^H$$

As illustrated by this equation, the initial channel matrix $H_1$ may be decomposed into three unitary matrices $U_1$, $\Sigma_1$, and $V_1^H$, in which the beamforming matrix $V_1$ is a unitary matrix that may be used for the beamforming by the transmitting station and the superscript 'H' represents the Hermitian transpose.

In these embodiments, the differential beamforming matrix $V'_2$ may be derived from the following equation:

$$H_2 V_1 = U_2 \Sigma_2 V_2^H V_1 = U_2 \Sigma_2 V_2'^H$$

In this equation, the differential beamforming matrix may comprise $V'_2 = V_2^H V_1$, although the scope of the invention is not limited in this respect. As can be seen, differential beamforming matrix $V'_2$ may be close to an identity matrix allowing the use of a polar-cap codebook. In these embodiments, for one data stream, differential beamforming matrix $V'_2$ may be approximately equal to the vector $[1, 0, \ldots, 0]^T$ allowing the tracking of the deviation of vectors in the full-manifold codebook, although the scope of the invention is not limited in this respect.

In some embodiments, after receiving codeword 301 of the full-manifold codebook, the transmitting station may apply beamforming coefficients derived or generated from codeword 301 of the full-manifold codebook to a first data transmission (i.e., data packet 206). After receipt of codeword 306 of the polar-cap codebook, transmitting station may apply beamforming coefficients derived from codeword 306 of the polar-cap codebook for a subsequent data transmission (i.e., data packet 210). In these embodiments, the codewords of the polar-cap codebook and the full-manifold codebook may correspond to beamforming matrices for use by beamformer 114. As illustrated in FIG. 2, data packet 206 may comprise one or more data streams illustrated by 's' which are shown as being transmitted with the application of initial beamforming matrix $V_1$ (i.e., $V_1$*s). Data packet 210, which also may comprise one or more data streams illustrated by 's', is shown as being transmitted with the application of beamforming matrix $V_2*V_1$ (i.e., $V_2*V_1$*s), as discussed above.

In some embodiments, the coherency time of channel 104 may be greater than the time between receiving codeword 301 of the full-manifold codebook and codeword 306 of the polar-cap codebook allowing a transmitting station to react in a time substantially less than the coherency time of channel 104. In other words, the transmitting station, such as base station 102, may be able to react to small changes in channel 104 within time periods substantially less than the coherency time of channel 104. In some embodiments, when channel 104 is an indoor channel, the coherency time of channel 104 may be longer than a few tenths of a millisecond (ms) while the time between data packets 206 and 210 may be as short as 200 microseconds (μs).

In some embodiments, the channel-state feedback, represented by codewords 301 of a full-manifold codebook and codewords 306 of a polar-cap codebook, may be provided in a non-uniform manner both in time and in frequency. Some of these embodiments are described in more detail below.

Figure 4:
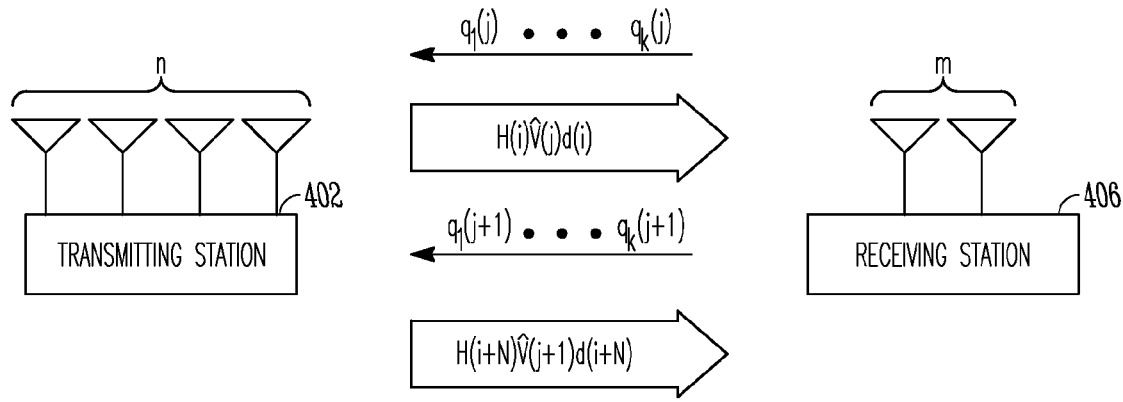
FIG. 4 illustrates differential feedback between a transmitting station and a receiving station in accordance with some embodiments of the present invention.

FIG. 4 illustrates differential feedback between a transmitting station and a receiving station in accordance with some embodiments of the present invention. In these embodiments, transmitting station 402 may correspond to base station 102 (FIG. 1), and receiving station 406 may correspond to mobile station 106 (FIG. 1), although the scope of the invention is not limited in this respect. As illustrated in FIG. 4, transmitting station 402 sends beamformed signal $\hat{V}(j)d(i)$ through the channel, (represented as H(i), to receiving station 406, in which j is a transmit subframe index, i is a feedback period index, $\hat{V}(j)$ is the accumulated beamforming matrix at transmitting station 402, and k represents the number of transmitted data streams. As further illustrated in FIG. 4, transmitting station 402 multiplies the beamforming matrixes cumulatively to track channel variation between the feedback. In some embodiments, the current beamforming matrix may be represented as:

$$\hat{V}(j)=\hat{V}(j-1)\tilde{V}(j),$$

in which $\hat{V}(j-1)$ represents the previous beamforming matrix and $\tilde{V}(j)$ represents the latest beamforming matrix generated from the feedback. In this equation, j represents a current time period, such as a frame, and j−1 represents the prior time period, such as a prior frame. If the beamforming matrix is an n×k matrix and k<n, the matrix may be expanded by transmitting station 102 to an n×n matrix by adding n−k orthogonal, unitary columns. The added columns do not need to be unique. In the next period, receiving station 406 may determine the latest channel matrix from the common pilot signals, the beamforming matrix $\hat{V}(j)$ from a control link or a dedicated pilot signal, and may compute the differential beamforming matrix $\tilde{V}(j+1)$ In some embodiments, decomposition circuitry 122 (FIG. 1) may first compute a singular value decomposition of $\hat{H}$, which may be the predicted channel matrix during the next transmission period as $\hat{H}=\hat{U}\hat{\Sigma}\hat{V}^H$, where $\hat{V}$ is n by n complex unitary matrix. In these embodiments, a differential update to the beamforming matrix may be computed as:

$$\tilde{V}(j+1)=\hat{V}^H(j)\hat{V}.$$

Receiving station 406 may include a quantizer as part of codeword generator 120 to quantize $\tilde{V}(j+1)$. As illustrated in FIG. 4, quantization indexes ($q_k$) may be sent to transmitting station 402 for use during the next time period. In some embodiments when rank adaptation is applied, the first k columns of $\tilde{V}(j+1)$ may be quantized by receiving station 406 and sent to transmitting station 402. In these rank adaptation embodiments, the first k columns may correspond to the strongest k singular modes of $\hat{H}$, although the scope of the invention is not limited in this respect.

In some embodiments, the quantization of $\tilde{V}(j+1)$ may be computed as in accordance with the following equation:

$$\tilde{V}(j+1) = \underset{V_i}{\mathrm{argmax}}\|diag(V^H(j+1)V_i)\|,$$

in which $V_i$ represents the i-th codeword in a differential matrix codebook (e.g., a polar-cap codebook) and $\tilde{V}(j+1)$ may be the quantized matrix.

The differential feedback illustrated in FIG. 4 may be robust to feedback error since each feedback may correct any beamforming error in the previous beamforming. Accordingly, error propagation may be reduced or eliminated. Any beamforming error and feedback error may be corrected by subsequent feedback. In some embodiments, a reduction in feedback of up to 35% or more may be achieved over conventional non-differential feedback.

FIGS. 5A-5F illustrate channel state feedback in accordance with embodiments of the present invention. In FIGS. 5A-5F, frequency (f) is shown in the x-axis and time (t) is shown in the y-axis. The squares represent clusters of several tones in the frequency dimension and groups of OFDM symbols in the time dimension. In FIGS. 5A-5F, codewords 301 correspond to codewords of the full-manifold codebook and are illustrated with diagonal lines from upper-left to lower-right, codewords 306 correspond to codewords of a polar-cap codebook and are illustrated with diagonal lines from lower-left to upper-right, and blocks 307 without codewords are illustrated with crosshatching.

Figure 5A:
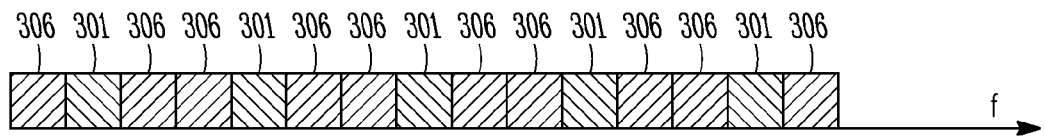
FIGS. 5A through 5F illustrate channel state feedback in accordance with various embodiments of the present invention.

In these embodiments, channel 104 (FIG. 1) may be an OFDM channel comprising a plurality of tones. A cluster of tones may have a bandwidth (i.e., the cluster span) that is substantially less than the coherence bandwidth of the channel. As illustrated in FIG. 5A, codewords 301 of the full-manifold codebook are provided for some of the clusters (i.e., every third or so cluster), and codewords 306 of the polar-cap codebook are provided for the other clusters. As can be seen, in these embodiments, only a partial channel state is fed back to the transmitting station. In these embodiments, the transmitting station may perform an interpolation to determine the beamforming matrix for individual tones.

In some embodiments, the coherence bandwidth of the channel may be a few MHz. In some OFDM embodiments, the tone spacing between may be about 15 kHz and a cluster may comprise up to 25 tones. The cluster span may be up to 375 kHz, although the scope of the invention is not limited in this respect. In some embodiments, a full channel may comprise up to 24 of more clusters, although the scope of the invention is not limited in this respect.

Figure 5B:
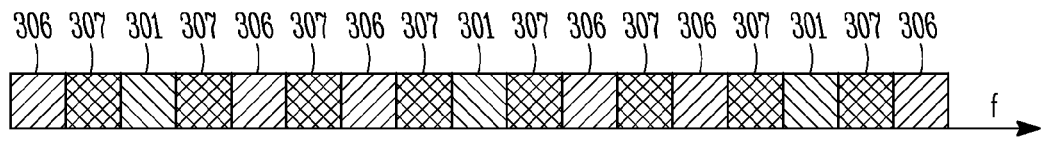

In the embodiments illustrated in FIG. 5B, no feedback is provided in blocks 307. In these embodiments, the transmitting station may perform an interpolation to determine the appropriate beamforming matrix. In some embodiments, the receiving station may refrain from providing codewords 301 of the full-manifold codebook or codewords 306 of the polar-cap codebook for some clusters, illustrated by blocks 307.

Figure 5C:
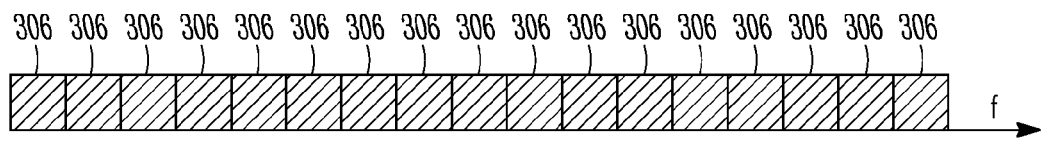
Figure 5D:
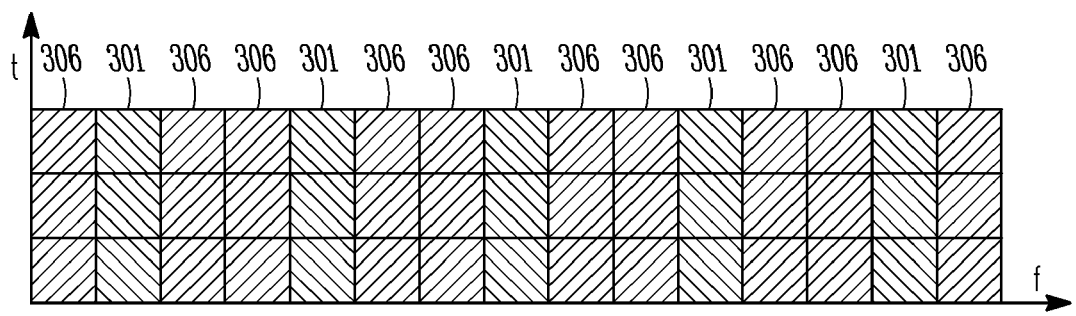

In the embodiments illustrated in FIG. 5C, codewords 306 of a polar-cap codebook are provided as an initial beamforming matrix $V_1$ as well as for subsequent feedback. In these embodiments, codewords 301 of the full-manifold codebook may not need to be provided. Although FIG. 5C illustrates codewords 306 being provided for each cluster, this is not a requirement as the receiving station may refrain from providing codewords 306 of the polar-cap codebook for some clusters, such as in FIG. 5B.

Figure 5E:
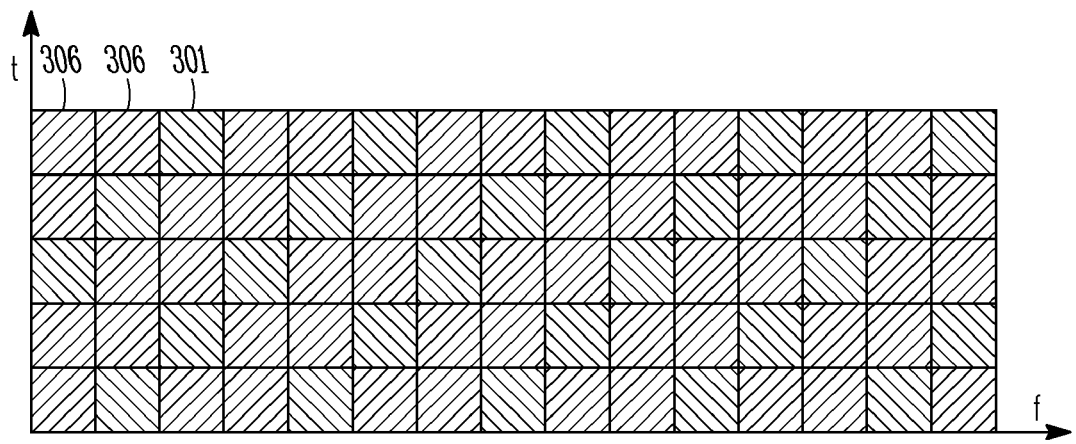
Figure 5F:
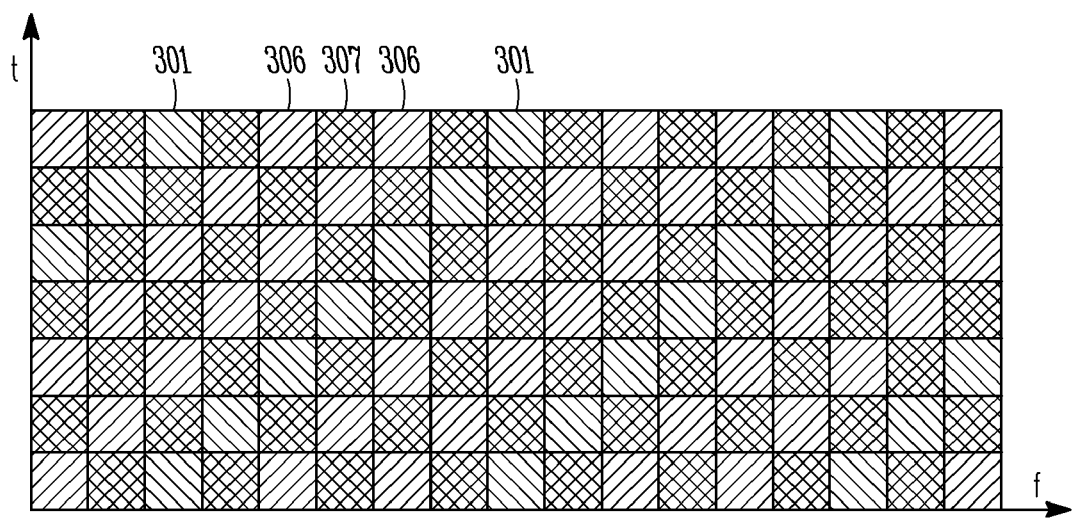

As illustrated in FIGS. 5E and 5F, codewords 301 of the full-manifold codebook and codewords 306 of the polar-cap codebook may be further shifted over time (in addition to frequency) to different clusters (e.g., for different frames of groups of OFDM symbols). As illustrated in FIG. 5F, some blocks, such as blocks 307, may be provided without feedback.

In some embodiments, codewords 301 and 306 may be generated by time-domain sampling groups of received OFDM symbols over time (e.g., one or more frames or a portion of a frame). In some embodiments, codeword 301 of the full-manifold codebook may be quantized, as previously discussed, to a first predetermined number of bits. Codeword 306 of the polar-cap codebook may be quantized to a second predetermined number of bits. In these embodiments, the second predetermined number may be less than the first predetermined number. In some embodiments, quantized beamforming matrices may be transmitted instead of the codewords, although the scope of the invention is not limited in this respect.

In some embodiments, base station 102 (FIG. 1) may a wireless access point (AP), such as a Wireless Fidelity (WiFi), Worldwide Interoperability for Microwave Access (WiMax), or broadband communication station, although the scope of the invention is not limited in this respect as base station 102 (FIG. 1) may be part of almost any wireless communication device. In some embodiments, base station 102 (FIG. 1) may be a communication station, such as a WiFi, WiMax, or broadband wireless access (BWA) network communication station, although the scope of the invention is not limited in this respect.

In some embodiments, the frequency spectrum for a multicarrier communication signals communicated between base station 102 (FIG. 1) and mobile station 104 (FIG. 1) may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for communications may comprise frequencies between 2 and 11 GHz, although the scope of the invention is not limited in this respect.

In some embodiments, base station 102 (FIG. 1) and mobile station 104 (FIG. 1) may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks (WLANs), although the scope of the invention is not limited in this respect as they may also be suitable to transmit and/or receive communications in accordance with other techniques and standards. In some embodiments, base station 102 (FIG. 1) and mobile station 104 (FIG. 1) may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

In some embodiments, mobile station 106 (FIG. 1) may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 116 (FIG. 1) and antennas 126 (FIG. 1) may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some embodiments, antennas 116 (FIG. 1) and/or antennas 126 (FIG. 1) may be effectively separated to take advantage of spatial diversity and the different channel characteristics that may result between each of antennas 116 (FIG. 1) of base station 104 (FIG. 1) and each of antennas 126 (FIG. 1) of mobile station 106 (FIG. 1).

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a transmitting station for transmitting two or more data streams through a channel, the method comprising:
   receiving a codeword of a full-manifold codebook, the codeword generated based on an initial channel matrix;
   subsequently receiving a codeword of a polar-cap codebook, the codeword of the polar-cap codebook representing deviations in the channel since receiving the codeword of the full-manifold codebook; and
   performing beamforming to transmit packets to a receiving station by applying beamforming coefficients derived from a codeword of the full-manifold codebook to an initial data transmission and by applying beamforming coefficients derived from a codeword of the polar-cap codebook to a subsequent data transmission,
   wherein the polar-cap codebook comprises a differential codebook that is smaller in size than the full-manifold codebook.

2. The method of claim 1 wherein the codeword of the full-manifold codebook corresponds to an initial beamforming matrix for application by a beamformer of the transmitting station, and
   wherein the codeword of the polar-cap codebook corresponds to a differential beamforming matrix for use in deriving a second beamforming matrix by the transmitting station using the differential beamforming matrix and the initial beamforming matrix.

3. The method of claim 2 wherein the full-manifold codebook comprises codewords corresponding to vectors that populate a surface of a manifold, and
   wherein codewords of the polar-cap codebook are within a polar ring on the surface of the manifold.

4. The method of claim 2 wherein the receiving station generates the initial channel matrix based on measured channel conditions and calculates the initial beamforming matrix by performing a decomposition of the initial channel matrix, and
   wherein the receiving station generates a second channel matrix based on subsequently measured channel conditions and calculates the differential beamforming matrix associated with the codeword of the polar-cap codebook.

5. The method of claim 4 wherein the receiving station derives the differential beamforming matrix from the equation $V'_2 = V_2^H * V_1$ in which $V'_2$ represents the differential beamforming matrix, $V_1$ represents the initial beamforming matrix, and $V_2^H$ represents a Hermitian transpose of the second beamforming matrix, and
   wherein the second beamforming matrix $V_2$ comprises a decomposition matrix of the second channel matrix.

6. A method performed by a transmitting station for transmitting two or more data streams through a channel, the method comprising:
   receiving a codeword of a full-manifold codebook, the codeword generated based on an initial channel matrix;
   subsequently receiving a codeword of a polar-cap codebook, the codeword of the polar-cap codebook representing deviations in the channel since receiving the codeword of the full-manifold codebook;
   performing beamforming to transmit packets to a receiving station using the codeword;
   after receiving the codeword of the full-manifold codebook, applying beamforming coefficients derived from the codeword of the full-manifold codebook to a first data transmission; and
   after receipt of the codeword of the polar-cap codebook, applying beamforming coefficients derived from the codeword of the polar-cap codebook for a subsequent data transmission,
   wherein the polar-cap codebook comprises a differential codebook that is smaller in size than the full-manifold codebook,
   wherein the codeword of the full-manifold codebook corresponds to an initial beamforming matrix for application by a beamformer of the transmitting station,
   wherein the codeword of the polar-cap codebook corresponds to a differential beamforming matrix for use in deriving a second beamforming matrix by the transmitting station using the differential beamforming matrix and the initial beamforming matrix,
   wherein the codewords of the polar-cap codebook and the full-manifold codebook correspond to beamforming matrices for use by the beamformer of the transmitting station.

7. The method of claim 1 wherein a coherency time of the channel is greater than a time between receiving the codeword of the full-manifold codebook and receiving the codeword of the polar-cap codebook allowing the transmitting station to react in a time less than the coherency time.

8. A method performed by a transmitting station for transmitting two or more data streams through a channel, the method comprising:
   receiving a codeword of a full-manifold codebook, the codeword generated based on an initial channel matrix;
   subsequently receiving a codeword of a polar-cap codebook, the codeword of the polar-cap codebook representing deviations in the channel since receiving the codeword of the full-manifold codebook; and
   performing beamforming to transmit packets to a receiving station using the codeword,
   wherein the polar-cap codebook comprises a differential codebook that is smaller in size than the full-manifold codebook,
   wherein the channel comprises an orthogonal frequency division multiplexed (OFDM) comprising a plurality of tones,
   wherein a cluster of tones has a bandwidth that is less than a coherence bandwidth of the channel,
   wherein feedback comprising codewords of the full-manifold codebook is provided for some of the clusters,
   wherein feedback comprising codewords of the polar-cap codebook is provided for at least some other of the clusters for which the codewords of the full-manifold codebook were not provided, and
   wherein the codewords are generated by time-domain sampling groups of received OFDM symbols over time.

9. The method of claim 8 wherein the feedback comprising the codewords of the full-manifold codebook and the feedback comprising the codewords of the polar-cap codebook are shifted over time to different clusters.

10. The method of claim 8 further comprising refraining from providing feedback comprising either the codewords of the full-manifold codebook or the codewords of the polar-cap codebook for some clusters.

11. The method of claim 1 wherein the codeword of the full-manifold codebook and the codeword of the polar-cap codebook are received as part of separately transmitted packets transmitted by the receiving station,
   wherein the codeword of the full-manifold codebook is quantized to a first predetermined number of bits and the codeword of the polar-cap codebook is quantized to a second predetermined number of bits, the second predetermined number being less than the first predetermined number, and wherein the codeword of the full-manifold codebook and the codeword of the polar-cap codebook are transmitted by the receiving station as part of separate channel-quality-indicator (CQI) packets.

12. A method for beamforming performed by a transmitting station, the method comprising:

initially receiving a codeword of a polar-cap codebook; and subsequently receiving additional codewords of the polar-cap codebook, the subsequently received codewords of the polar-cap codebook representing deviations in a channel since receiving a prior codeword of the polar-cap codebook;

performing beamforming to transmit packets to a receiving station by applying beamforming coefficients derived from a codeword of a full-manifold codebook to an initial data transmission and by applying beamforming coefficients derived from a codeword of the polar-cap codebook to a subsequent data transmission, wherein the polar-cap codebook is a differential codebook comprising codewords within a polar ring on a surface of a manifold of the full-manifold codebook, and wherein the full-manifold codebook comprises a full set of codewords for use in encoding a beamforming matrix.

13. The method of claim 12 wherein the codewords of the polar-cap codebook are received at the transmitting station and are determined by the receiving station based on decomposition of a current channel matrix and decomposition of a prior channel matrix.

14. The method of claim 13 further comprising:

generating beamforming coefficients from the codewords of the polar-cap codebook received from the receiving station; and applying the beamforming coefficients to frequency-domain signals of two or more data streams prior to transmission.

15. A transmitting station for transmitting two or more data streams through a channel, the transmitter comprising:

a matrix generator to generate an initial beamforming matrix from a received codeword of a full-manifold codebook, the codeword generated based on an initial channel matrix, the matrix generator to further generate a second beamforming matrix from a subsequently received codeword of a polar-cap codebook, the codeword of the polar-cap codebook representing deviations in the channel since the generation of the codeword of the full-manifold codebook; and a beamformer to apply the beamforming matrices to frequency-domain signals prior to transmission by two or more antennas, wherein the beamformer is to apply beamforming coefficients derived from a codeword of the full-manifold codebook to an initial data transmission and is to apply beamforming coefficients derived from a codeword of the polar-cap codebook to a subsequent data transmission, and wherein the polar-cap codebook comprises a differential codebook that is smaller in size than the full-manifold codebook.

16. The transmitting station of claim 15 wherein the codeword of the full-manifold codebook corresponds to an initial beamforming matrix for application by the beamformer, wherein the codeword of the polar-cap codebook corresponds to a differential beamforming matrix for use in deriving the second beamforming matrix by the transmitting station using the differential beamforming matrix and the initial beamforming matrix, wherein the full-manifold codebook comprises codewords corresponding to vectors that populate a surface of a manifold, and wherein codewords of the polar-cap codebook are within a polar ring on the surface of the manifold.

17. The transmitting station of claim 16 wherein the channel comprises an orthogonal frequency division multiplexed (OFDM) comprising a plurality of tones, wherein a cluster of tones has a bandwidth that is less than a coherence bandwidth of the channel, wherein feedback comprising codewords of the full-manifold codebook is provided for some of the clusters, wherein feedback comprising codewords of the polar-cap codebook is provided for at least some other of the clusters for which the codewords of the full-manifold codebook were not provided, and wherein the codewords are generated by time-domain sampling groups of received OFDM symbols over time.

18. A multiple-input multiple-output (MIMO) system comprising:

a receiving station to generate a codeword of a full-manifold codebook based on an initial channel matrix, and to subsequently generate a codeword of a polar-cap codebook, the codeword of the polar-cap codebook representing deviations in the channel since receiving the codeword of the full-manifold codebook; and a transmitting station to generate an initial beamforming matrix from the codeword of the full-manifold codebook to perform beamforming for an initial data transmission, and to further generate a second beamforming matrix from a subsequently received codeword of the polar-cap codebook to perform beamforming for a subsequent data transmission, the codeword of the polar-cap codebook representing deviations in the channel since the generation of the codeword of the full-manifold codebook, wherein the polar-cap codebook comprises a differential codebook that is smaller in size than the full-manifold codebook.

19. The MIMO system of claim 18 wherein the codeword of the full-manifold codebook corresponds to the initial beamforming matrix for application by a beamformer, wherein the codeword of the polar-cap codebook corresponds to a differential beamforming matrix for use in deriving the second beamforming matrix by the transmitting station using the differential beamforming matrix and the initial beamforming matrix, wherein the full-manifold codebook comprises codewords corresponding to vectors that populate a surface of a manifold, and wherein codewords of the polar-cap codebook are within a polar ring on the surface of the manifold.

20. The MIMO system of claim 19 wherein the transmitting station comprises a matrix generator to generate the beamforming matrices, and a beamformer to apply the beamforming matrices to two or more data streams for transmission through the channel using two or more transmit antennas.

* * * * *